(12) United States Patent
Day et al.

(10) Patent No.: US 10,919,459 B2
(45) Date of Patent: Feb. 16, 2021

(54) VEHICLE HAVING VEHICLE-MOUNTED DUAL RETRACTABLE TELESCOPING STRUCTURES HOUSING SURVEILLANCE EQUIPMENT WITH ONE STRUCTURE BEING MOUNTED TO FLATBED OF THE VEHICLE AND ANOTHER STRUCTURE BEING FULLY RETRACTABLE WITHIN VEHICLE

(71) Applicant: Freedom Surveillance, LLC, Scottsdale, AZ (US)

(72) Inventors: Larry L. Day, Scottsdale, AZ (US); Mark J. Howell, Tucson, AZ (US); Eric Schleppegrell, Tucson, AZ (US); David Ausley, Phoenix, AZ (US)

(73) Assignee: FREEDOM SURVEILLANCE, LLC, Scottsdale, AZ (US)

( * ) Notice: Subject to any disclaimer, the term of this patent is extended or adjusted under 35 U.S.C. 154(b) by 44 days.

(21) Appl. No.: 16/545,690

(22) Filed: Aug. 20, 2019

(65) Prior Publication Data
US 2020/0114836 A1 Apr. 16, 2020

Related U.S. Application Data

(60) Provisional application No. 62/720,085, filed on Aug. 20, 2018.

(51) Int. Cl.
*B60R 11/04* (2006.01)
*F16M 11/38* (2006.01)
(Continued)

(52) U.S. Cl.
CPC .............. *B60R 11/04* (2013.01); *B60J 10/80* (2016.02); *F16M 11/28* (2013.01); *F16M 11/38* (2013.01);
(Continued)

(58) Field of Classification Search
CPC .......... B60R 11/04; B60J 10/80; F16M 11/28; F16M 11/38
(Continued)

(56) References Cited

U.S. PATENT DOCUMENTS

| 4,593,474 A * | 6/1986 | Mayhew | G01C 15/00 |
| | | | 280/764.1 |
| 4,815,757 A * | 3/1989 | Hamilton | B60R 11/04 |
| | | | 182/69.4 |

(Continued)

OTHER PUBLICATIONS

The Will-Burt Company, Military Elevation Solutions and Tactical Trailers, http://www.willburt.com, Sep. 2017, 24 pages (Year: 2017).*

(Continued)

*Primary Examiner* — Clayton E. LaBalle
*Assistant Examiner* — Kevin C Butler
(74) *Attorney, Agent, or Firm* — Panitch Schwarze Belisario & Nadel LLP

(57) ABSTRACT

A vehicle is provided having an interior cabin and a roof at the top of the interior cabin. The vehicle includes a flatbed, an opening in the roof of the interior cabin, a first retractable telescoping structure having a first set of surveillance equipment mounted to the flatbed, and a second retractable telescoping structure having a second set of surveillance equipment mounted so as to extend through the opening of the roof, and to fully retract into the interior cabin. A sealing device mounts to the second retractable telescoping structure below the second set of surveillance equipment and oriented parallel to the roof of the interior cabin. The sealing device includes an elastically deformable gasket that elastically deforms during travel of the sealing device through the roof of the interior cabin when the second set of surveillance equipment extends through the opening in the roof during extension of the second retractable telescoping structure, (Continued)

and when the second set of surveillance equipment retracts into the interior cabin during retraction of the second retractable telescoping structure.

9 Claims, 12 Drawing Sheets

(51) Int. Cl.
  *F16M 11/28* (2006.01)
  *B60J 10/80* (2016.01)
  *B60R 11/00* (2006.01)
(52) U.S. Cl.
  CPC . *B60R 2011/004* (2013.01); *B60R 2011/0082* (2013.01); *B60R 2011/0094* (2013.01)
(58) Field of Classification Search
  USPC .................................................... 49/475.1
  See application file for complete search history.

(56) References Cited

U.S. PATENT DOCUMENTS

| | | | | |
|---|---|---|---|---|
| 4,913,458 | A * | 4/1990 | Hamilton | B60R 11/04 212/304 |
| 5,168,679 | A * | 12/1992 | Featherstone | B66F 3/06 52/108 |
| 5,743,635 | A * | 4/1998 | Hulse | B60Q 1/2657 362/385 |
| 6,299,336 | B1 * | 10/2001 | Hulse | B60Q 1/2611 362/198 |
| 7,000,357 | B1 * | 2/2006 | Stearns | H01Q 1/1235 52/110 |
| 7,726,690 | B1 * | 6/2010 | James | B60S 9/02 280/764.1 |
| 8,276,325 | B2 * | 10/2012 | Clifton | H05K 5/0004 52/110 |
| 8,288,973 | B2 * | 10/2012 | Ford | E04H 12/182 318/277 |
| 8,305,287 | B2 * | 11/2012 | Sabatino | H01Q 1/1235 343/881 |
| 10,267,598 | B2 * | 4/2019 | Fougnies | F41G 1/38 |
| 10,294,688 | B2 * | 5/2019 | Gorney | E04H 12/345 |
| 10,348,944 | B2 * | 7/2019 | Kiehl | H04N 5/2253 |
| 2002/0060479 | A1 * | 5/2002 | Tolinski | B60J 5/104 296/216.04 |
| 2002/0158182 | A1 * | 10/2002 | Carter | F16F 15/06 248/638 |
| 2004/0041436 | A1 * | 3/2004 | Guillez | B60J 7/146 296/108 |
| 2005/0029458 | A1 * | 2/2005 | Geng | G08B 13/19608 250/347 |
| 2008/0258931 | A1 * | 10/2008 | Christensen | G08C 17/02 340/12.22 |
| 2009/0230709 | A1 * | 9/2009 | Beauchamp | B60R 11/04 296/1.04 |
| 2018/0257774 | A1 * | 9/2018 | Volpi | B25J 13/02 |
| 2020/0114836 | A1 * | 4/2020 | Day | F16M 13/02 |
| 2020/0148045 | A1 * | 5/2020 | Sanham | B60J 7/1204 |

OTHER PUBLICATIONS

Jacob Fraden, Handbook of Modern Sensors, Springer, 2010, 681 pages (Year: 2010).*
Strongwatch Freedom Surveillance, LLC, Freedom on the Move—FOTM, Strongwatch, 2017, 14 pages (Year: 2017).*
MJK Auto Sales, 2015 Ford F-150 FX4 Lifted Platinum 4×4 Panoramic Sunroof f150, https://www.mjkautosalesinc.com/, Cordova, California, 2015, 11 pages (Year: 2015).*
Ronde & Schwarz, Radiomonitoring & Radiolocation Catalog 2016, Munich, Germany, 2016, 230 pages (Year: 2016).*
Freedom on the Move (FOTM) Functional Overview, Copyright © 2017 Strongwatch | Freedom Surveillance, LLC, Last revised: Jun. 2018, 14 pages.

* cited by examiner

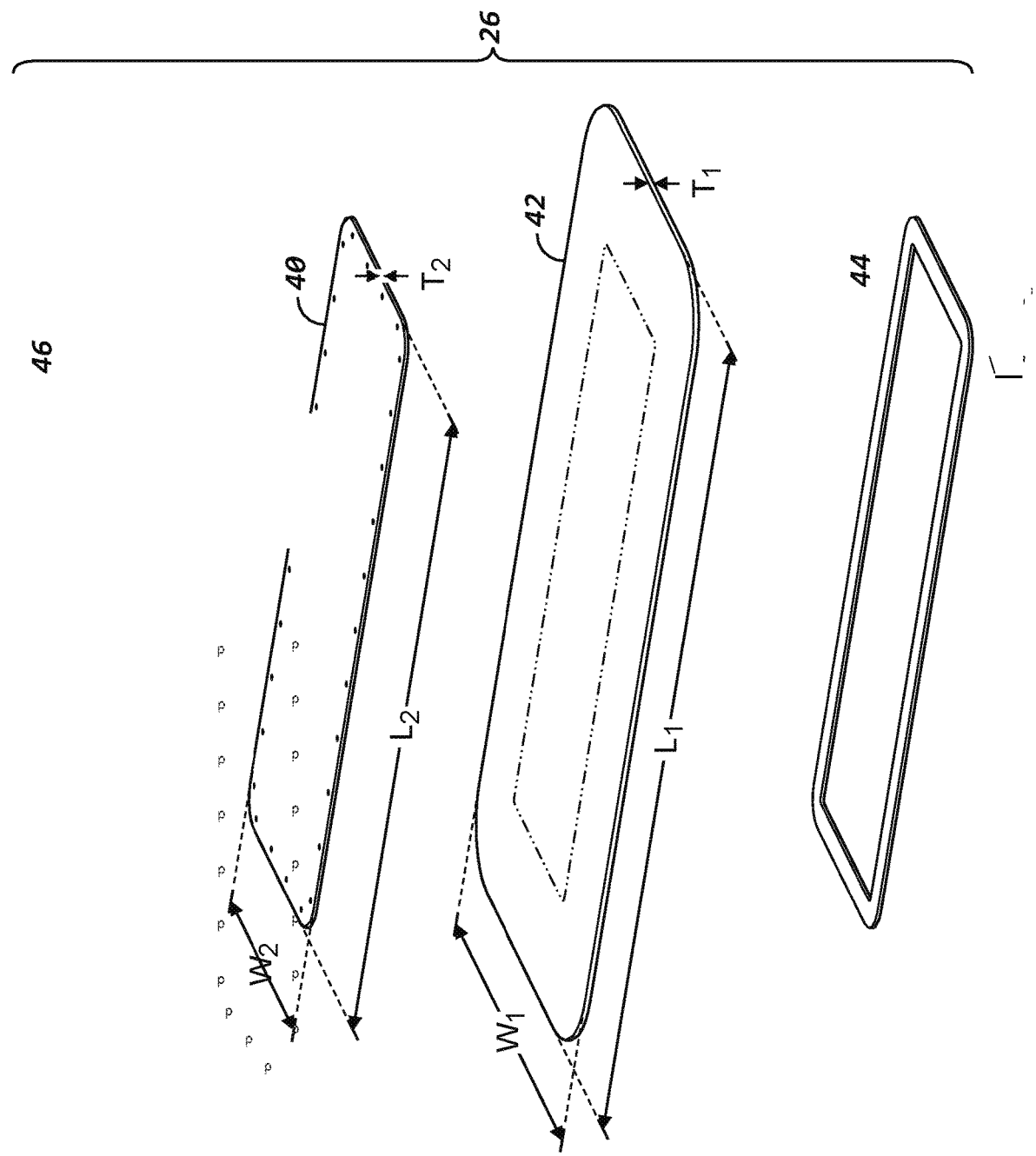

VEHICLE HAVING VEHICLE-MOUNTED DUAL RETRACTABLE TELESCOPING STRUCTURES HOUSING SURVEILLANCE EQUIPMENT WITH ONE STRUCTURE BEING MOUNTED TO FLATBED OF THE VEHICLE AND ANOTHER STRUCTURE BEING FULLY RETRACTABLE WITHIN VEHICLE

CROSS-REFERENCE TO RELATED APPLICATIONS

This application claims the benefit of U.S. Patent Application No. 62/720,085 filed Aug. 20, 2018, the disclosure of which is hereby incorporated by reference herein in its entirety.

BACKGROUND OF THE INVENTION

Retractable vehicle-mounted mobile surveillance equipment (also interchangeably referred to as "sensors") is well-known in the art. One example of such equipment is Freedom-On-The-Move (FOTM 3.0), which is commercially available from Freedom Surveillance, LLC dba STRONGWATCH®, Scottsdale, Ariz. The surveillance equipment is mounted to a flatbed of a truck. In its retractable state, the equipment fits entirely within the flatbed so that it can be completely hidden and protected from the elements using a conventional flatbed covering. FIGS. 5A and 5B are prior art views of such a truck. FIG. 5A shows the truck during operation of the surveillance equipment, and FIG. 5B shows the truck when the surveillance equipment is in its retracted state.

However, it is desirable to include additional surveillance equipment on the vehicle that is fully retractable into the interior space of the vehicle when not in use, and which can be retracted out of the vehicle during use. It is further desirable for the additional surveillance equipment to be hidden from view and protected from the elements when it is fully retractable into the interior space of the vehicle. The present invention fulfills such a need.

SUMMARY OF THE INVENTION

A vehicle is provided having an interior cabin and a roof at the top of the interior cabin. The vehicle includes a flatbed, an opening in the roof of the interior cabin, a first retractable telescoping structure having a first set of surveillance equipment mounted to the flatbed, and a second retractable telescoping structure having a second set of surveillance equipment mounted so as to extend through the opening of the roof, and to fully retract into the interior cabin. A sealing device mounts to the second retractable telescoping structure below the second set of surveillance equipment and oriented parallel to the roof of the interior cabin. The sealing device includes an elastically deformable gasket that elastically deforms during travel of the sealing device through the roof of the interior cabin when the second set of surveillance equipment extends through the opening in the roof during extension of the second retractable telescoping structure, and when the second set of surveillance equipment retracts into the interior cabin during retraction of the second retractable telescoping structure.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 3 is an exploded view of the sealing device shown in FIGS. 2A-2F, in accordance with one preferred embodiment of the present invention.

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one."

I. Overview

Figure 1A:
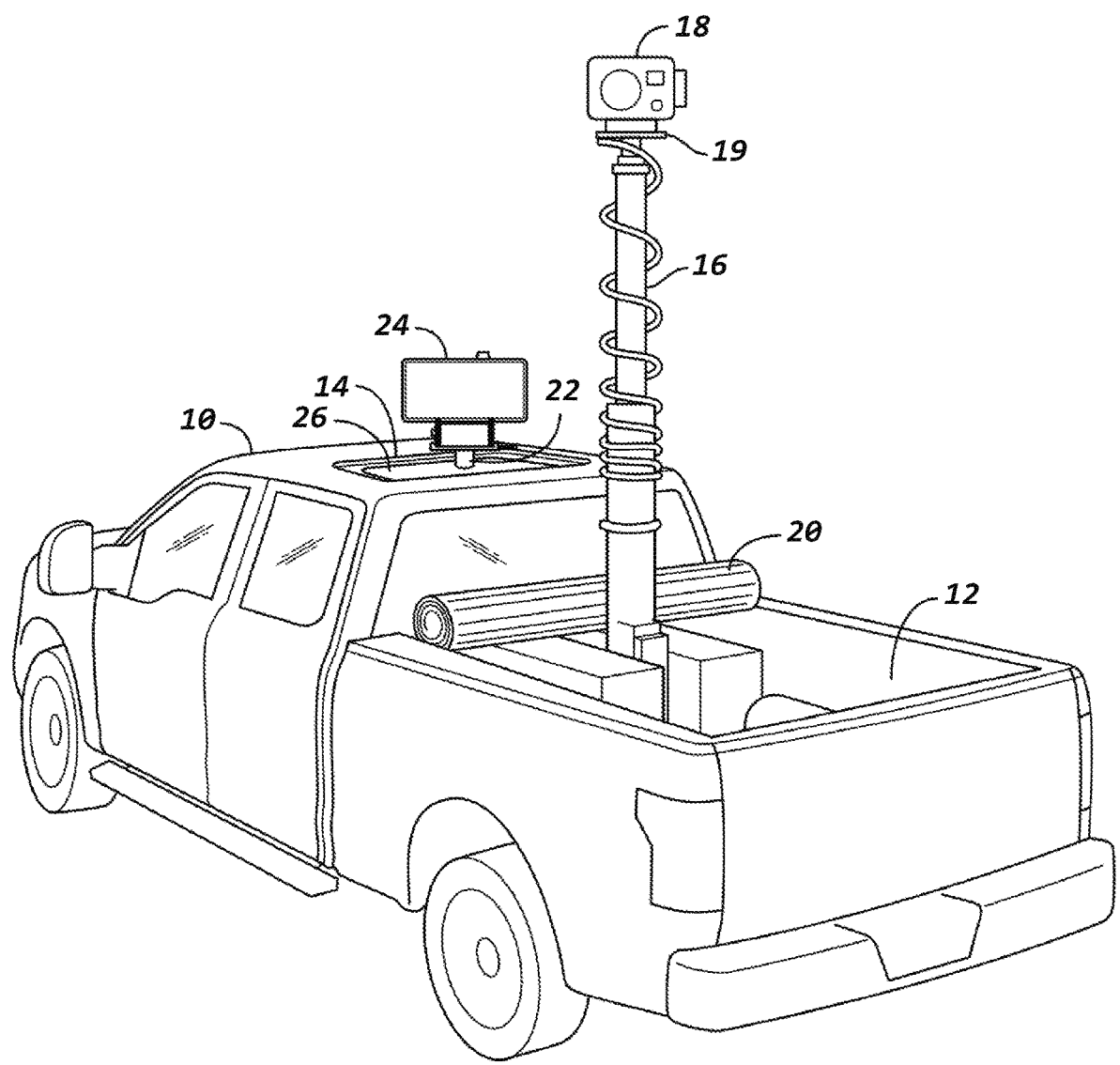
FIGS. 1A and 1B are perspective views of a vehicle in accordance with one preferred embodiment of the present invention.

Referring to FIG. 1A, in one preferred embodiment, the vehicle is a truck-like vehicle 10 comprising at least the following structural and additional add-on elements:

i. A flatbed 12.

ii. A retractable sunroof/moonroof 14 (hereafter, referred to as "sunroof 14"), preferably, having a horizontally retractable mechanism. More broadly, the sunroof 14 may simply be an opening cut through the roof of the vehicle 10 to allow objects to protrude out of the interior cabin of the vehicle 10. Thus, the sunroof 14 is one embodiment of such an opening. In one preferred embodiment, the sunroof 14 is mounted in reverse and programmed so that the tilt mechanism is disabled in order to prevent dust and debris from entering the vehicle when mobile. In FIG. 1A, the sunroof 14 is open.

iii. A first retractable telescoping structure 16 having a first set of surveillance equipment 18 mounted thereon. The first retractable telescoping structure 16 is fastened at its bottom to the floor of the flatbed 12, or to a mounting mechanism (not shown) that is fastened to the floor of the flatbed. The first retractable telescoping structure 16 retracts to a form factor that allows it, and the associated first set of surveillance equipment 18, to be completely stored in the flatbed and fully covered by flatbed cover 20, shown in its rolled up position in FIG. 1. In its fully extended, upright position, the first retractable telescoping structure 16 effectively functions as a mast, and the first set of surveillance equipment 18 is preferably mounted at or near a top portion of the mast. The first retractable telescoping structure may be the conventional structure described above, namely, FOTM 3.0. In one preferred embodiment, the first retractable telescoping structure 16 has a platform 19, and the first set of surveillance equipment 18 is removably mounted to the platform 19.

iv. A second retractable telescoping structure 22 having a second set of surveillance equipment 24 mounted thereon. When fully retracted, the second retractable telescoping structure 22 and the second set of surveillance equipment 24 is completely inside of the vehicle. When the second set of surveillance equipment 24 is in use, the second retractable telescoping structure allows the second set of surveillance equipment 24 to extend through the sunroof 14 by an amount sufficient to allow the second set of surveillance equipment 24 to be fully external to the vehicle 10. In its fully extended, upright position, the second retractable telescoping structure 22 also effectively functions as a mast, and the second set of surveillance equipment 24 is preferably mounted at or near a top portion of the mast.

v. A sealing device 26 to inhibit water and/or dirt from entering the passenger compartment of the vehicle 10 through the open sunroof 14 when the second set of surveillance equipment 24 is fully external to the vehicle 10, such as when it is in use. The sealing device 26 is fixed to a platform of the second retractable telescoping structure 22 as described in more detail below, and has a form factor that slightly exceeds the length and width dimensions of the sunroof 14, so as to provide a water-tight roof cover, and so that any water and/or dirt will have a harder time penetrating into the passenger compartment of the vehicle 10 (also, referred to interchangeably as the "interior cabin" or "interior cab"). The sealing device 26 also seals the interior cabin from the external environment so that if the interior cabin is air conditioned or heated, the cold or warm air will be inhibited from escaping out through the sunroof 14. The vehicle 10 may be deployed in harsh environments, such as deserts, where extreme heat, or snow and/or ice, may be present.

Figure 1B:
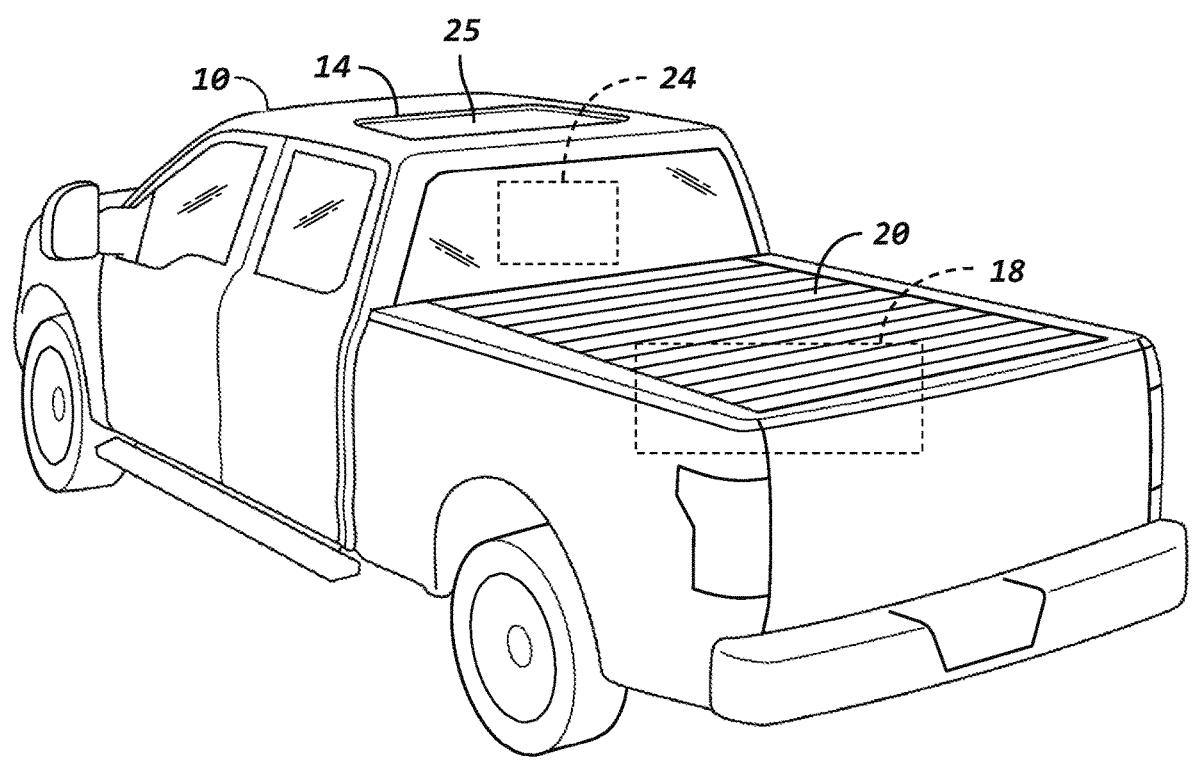

FIG. 1B shows the truck 10 of FIG. 1A when the first and second sets of surveillance equipment 18 and 24 are concealed, and the sunroof 14 is closed, and thus sunroof cover 25 is visible.

II. Detailed Disclosure

FIG. 3 shows an exploded view of the sealing device 26 in accordance with one preferred embodiment. The sealing device 26 includes a rigid support plate 40, an elastically deformable gasket 42, and a backing frame or flange 44. The elastically deformable gasket 42 is attached to the rigid support plate 40 via fasteners 46. Additional details of these components are described below.

Figure 4B:
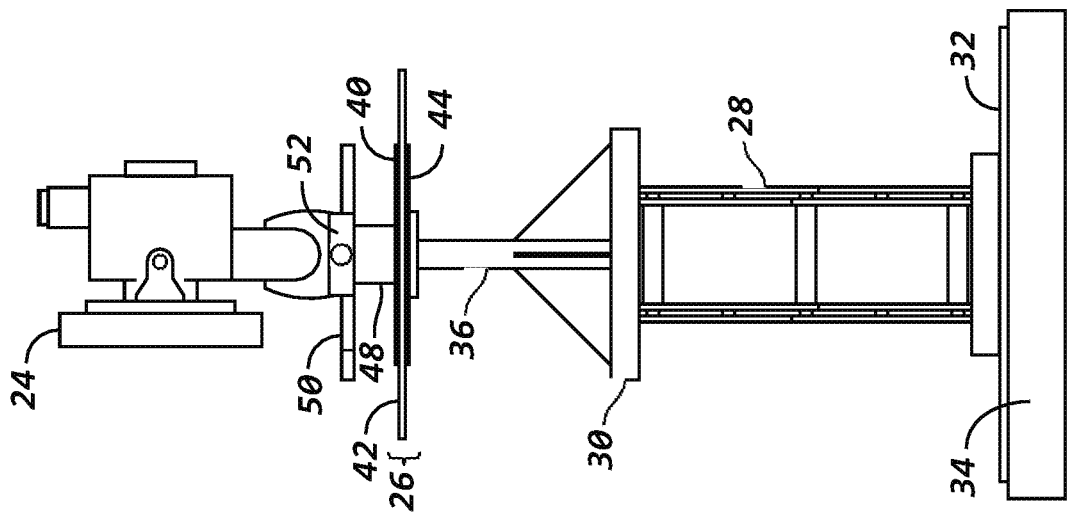
FIGS. 4A-4E are additional views and embodiments of the retractable telescoping structure having the set of surveillance equipment mounted thereon, and the sealing device shown in FIGS. 2A-2F.
Figure 4A:
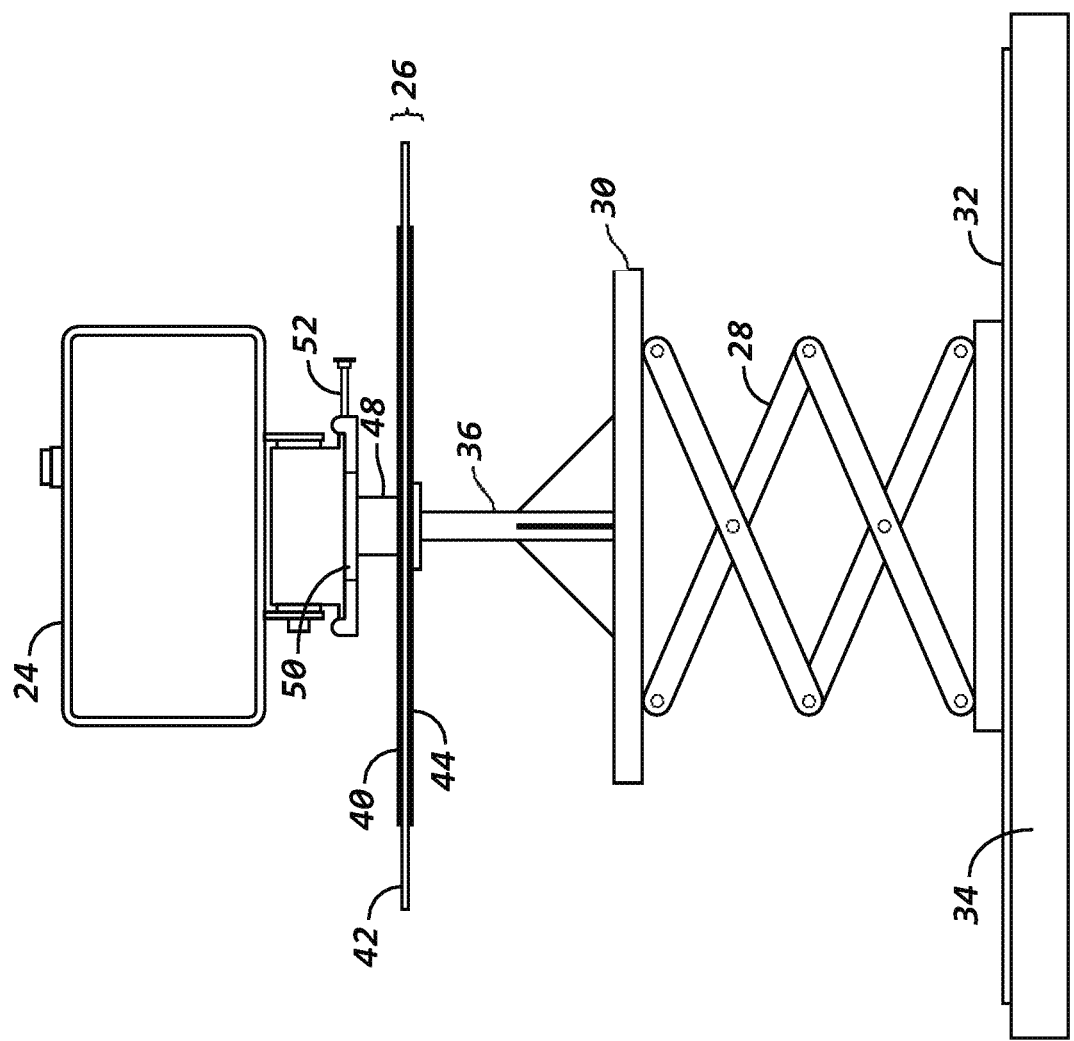

FIGS. 4A and 4B show one embodiment of the second retractable telescoping structure 22 as being a scissor jack mechanism 28 with a top platform 30. The second set of surveillance equipment 24 is secured to, or mounted onto, the second retractable telescoping structure 22 (scissor jack mechanism 28 with the top platform 30) as follows:

i. A pedestal-type brace 36 is fastened at one end to the top surface of the scissor jack top platform 30, and is attached at the other end to the bottom surface of the rigid support plate 40 of the sealing device 26.

ii. A support stand 48 having surveillance equipment platform 50 is fastened to the top surface of the rigid support plate 40 of the sealing device 26. In one preferred embodiment, the support stand 48 has a fixed height. In another embodiment, the support stand 48 is attached to, or is integrated with, a small telescoping mast (not shown) to provide additional height for the second surveillance equipment 24 above the roof line of the vehicle 10.

iii. The surveillance equipment 24 is secured to, or mounted onto, the surveillance equipment platform 50. In one embodiment, quick connect clamp 52 is used to secure the surveillance equipment 24 to the surveillance equipment platform 50.

In one configuration, the brace 36 is formed of triangular machined bracing. The brace 36 stabilizes and supports the support stand 48 and the selected surveillance equipment that is connected on the top of the surveillance equipment platform 50 (e.g., camera, sensor, radar, drone).

The dimensions of the top platform 30 are smaller (in length and width) than the dimensions of the sunroof 14 so that the top platform 30 can extend through the sunroof 14. The overall height of the fully retracted scissor jack mechanism 28, the brace 36, the sealing device 26, the support stand 48, and the second set of surveillance equipment 24 secured to, or mounted thereon, is less than the interior height of the vehicle's interior cabin so that the second set of surveillance equipment 24 can be hidden completely inside of the vehicle's interior cabin when not in use, and when the sunroof 14 is closed, as shown in FIG. 1B. If the support stand 48 is attached to, or is integrated with, a small telescoping mast, as described above, the height of the mast in its fully retracted position must be accounted for to ensure that the overall height of the assembly shown in FIGS. 4A and 4B (also, referred to herein as a "stack") can still fit entirely within the vehicle 10 when the second set of surveillance equipment 24 is not in use.

The second retractable telescoping structure 22, here, scissor jack mechanism 28 is preferably mounted in the back seat of vehicle 10 and on the back wall of interior cabin using existing seat and seat belt mounting points so that there are no new holes or cutting that would impact the structural integrity of the vehicle 10 or impact its warranty. Alternatively, the scissor jack mechanism 28 may be fastened to a plate 32 that lays on, or is slightly elevated from, the backseat floor 34 of the vehicle 10. Alternatively, the scissor jack mechanism 28 may be bolted directly to the backseat floor 34 of the vehicle 10.

Other mechanisms that telescopically extend and retract may be used in place of the scissor jack mechanism 28 for the second retractable telescoping structure 22.

The vehicle 10 may be a conventional, commercially available pickup truck, such as a Ford® F-150®. The cab of these vehicles includes mounting points that are typically used for attaching seats, seatbelts and other typical car components, and which can be used for mounting the second retractable telescoping structure 22.

The platforms 19 and 50 of the two respective retractable telescoping structures 16 and 22 are preferable designed to allow for interchangeability of the surveillance equipment 18 and 24 mounted thereto. The surveillance equipment 18 and 24 is preferably attached to their respective platforms 19 and 50 via quick clamp structure, described in more detail below.

Figure 4C:
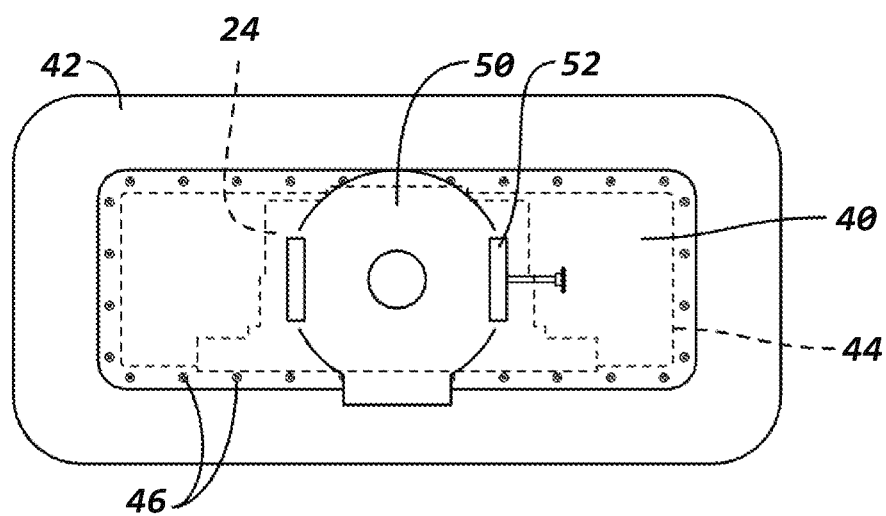

FIG. 4C is a top view of the elements shown in FIGS. 4A and 4B.

In one preferred embodiment, the second set of surveillance equipment 24 is a drone, and the top surface of the surveillance equipment platform 50 is a drone launching and landing platform (pad). In one alternative drone embodiment, shown in FIG. 4E, the drone (referred to herein as element 24) is placed on the surveillance equipment platform 50 prior to extending the second retractable telescoping structure 22 through the roof of the vehicle 10. After the second retractable telescoping structure 22 is extended to reach its operational position, the drone 24 is released via remote control commands, such as from an operator who is inside of the vehicle 10. Upon conclusion of a surveillance session, the drone 24 is returned to the surveillance equipment platform 50, and then is retrieved from the surveillance equipment platform 50 after the second retractable telescoping structure 22 retracts back into the interior of the vehicle 10.

Figure 4E:
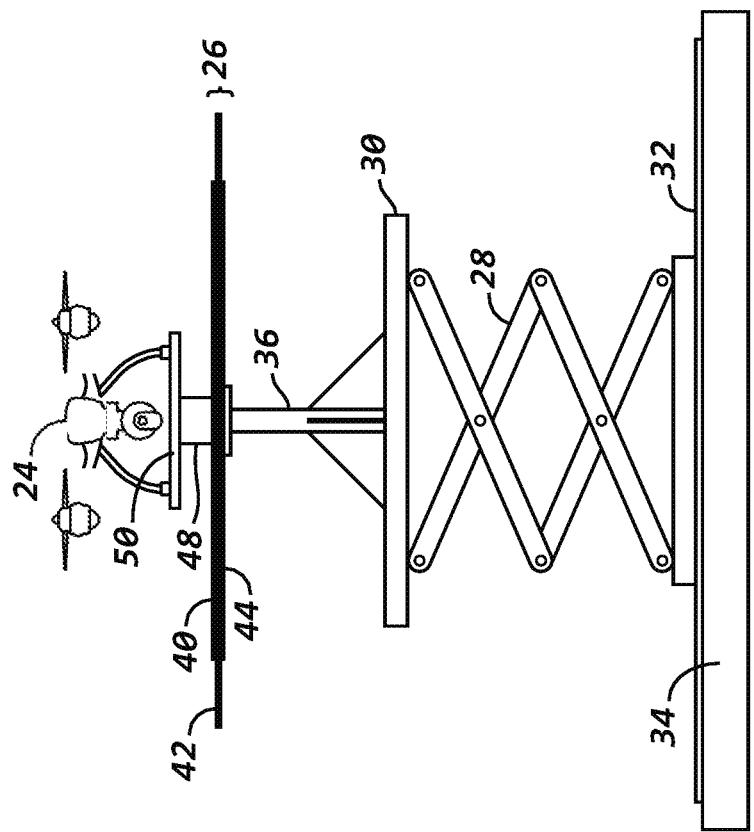
Figure 4D:
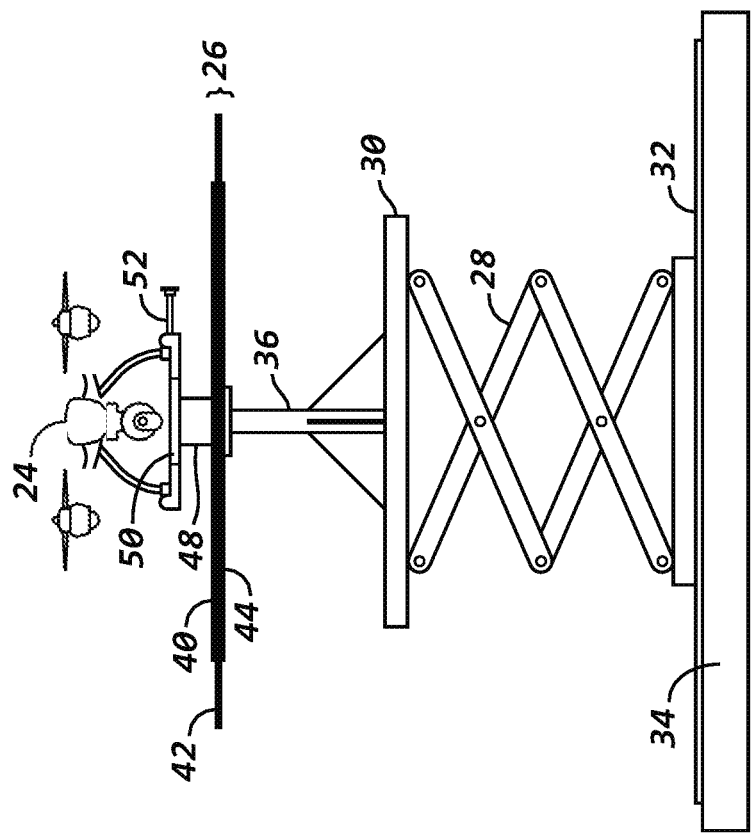
Figure 5A:
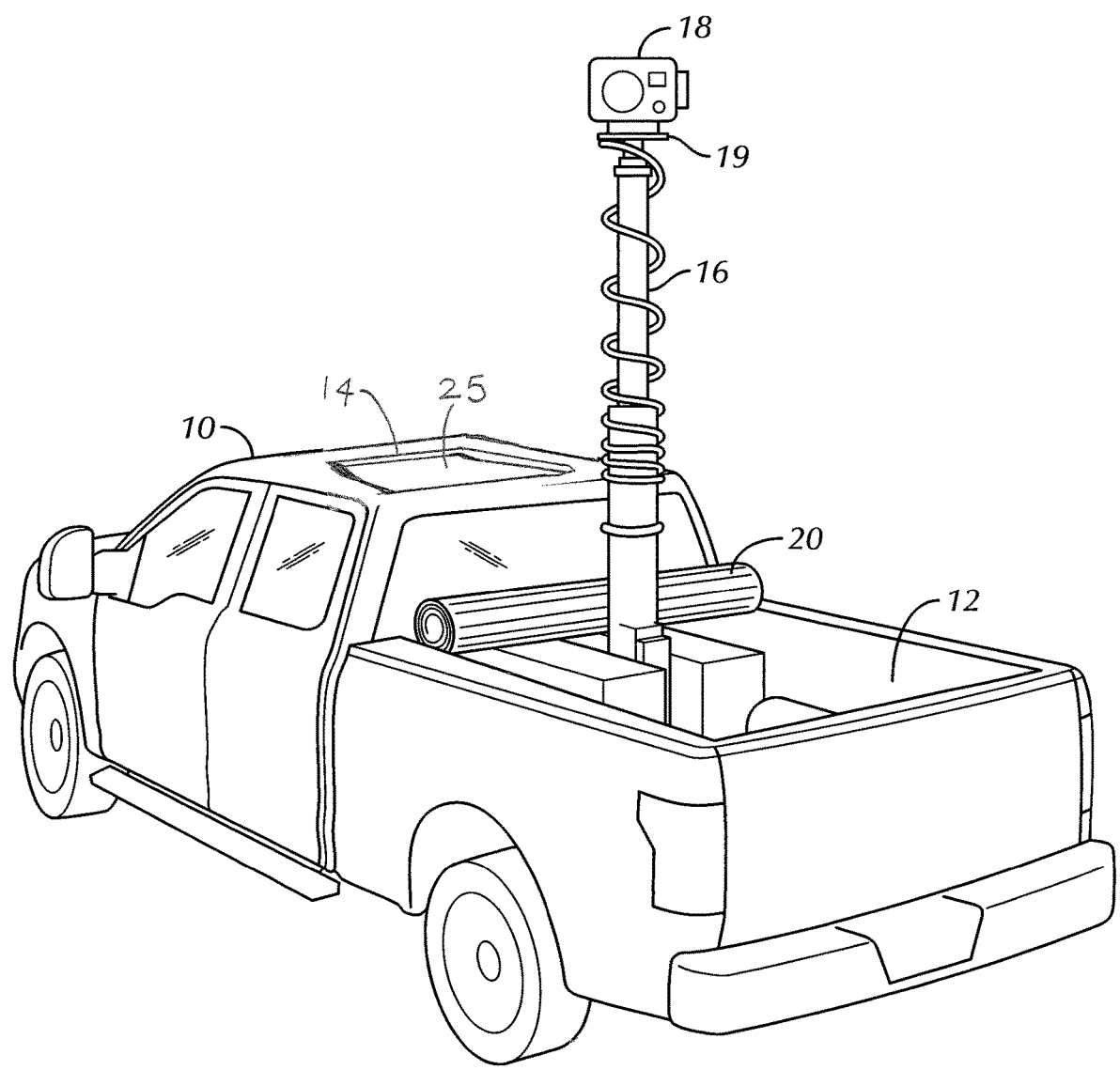
FIGS. 5A and 5B are perspective views of a prior art vehicle.
Figure 5B:
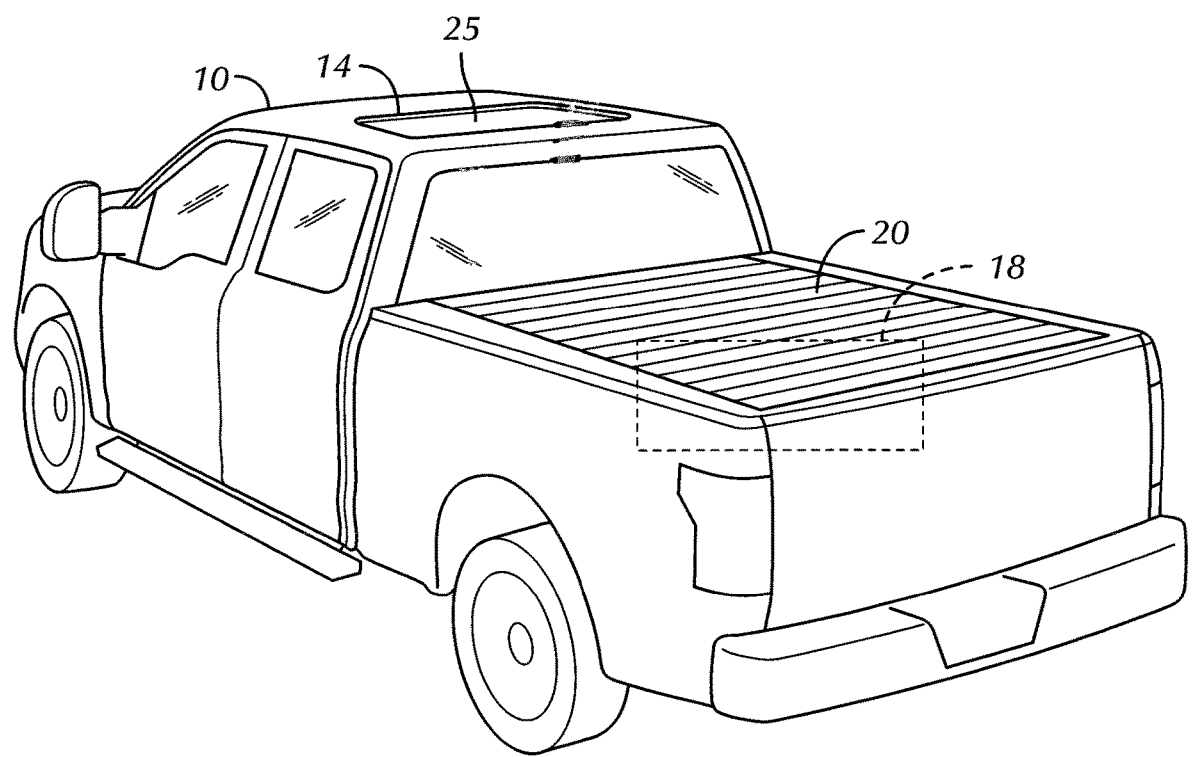

In another alternative drone embodiment shown in FIG. 4D, the drone 24 is secured to the surveillance equipment platform 50 by a suitable quick release mechanism, such as a specialized version of the quick connect clamp 52, that attaches to the legs or other structure of the drone. This embodiment is identical to the previous drone embodiment, except that the quick release mechanism must be released during initiation of the surveillance session, and locked back into place after the drone 24 is returned to the platform upon conclusion of the surveillance session. One advantage of this alternative embodiment over the embodiment of FIG. 4E is that if the vehicle 10 is in motion, there is less likelihood of the drone 24 being knocked off of the platform and damaged before and after it is used.

Any conventional drone and drone launching and landing platform (pad) configuration may be used for these embodiments.

In the preferred embodiment, it is desirable to use a vehicle that has a factory-installed or after-market installed sunroof, instead of cutting a custom opening into a roof of a vehicle that does not have a factory-installed or after-market installed sunroof. However, the scope of the invention does not require the use of a vehicle with a factory-installed or after-market installed sunroof. If a custom opening is cut, a leakproof cover plate may be installed over the opening when the second set of surveillance equipment 24 is not being used.

Referring again to FIG. 3, sample dimensions and compositions of the rigid support plate 40 and elastically deformable gasket 42 that comprise the sealing device 26 are as follows:

Rigid support plate 40:
⅛ inch solid galvanized sheet metal (thickness $T_2$ is ⅛ inch)
22 threaded 5/16 inch holes spaced along perimeter
30 inches×11 inches ($L_{2=30}$ inches; $W_{2=11}$ inches)
Backing frame 44:
⅛ inch solid galvanized sheet metal
22 matching threaded 5/16 inch holes spaced along perimeter
1 inch width
Elastically deformable gasket 42:
38½ inches×18½ inches ($L_1$=38½ inches; $W_1$=18½ inches)
Gasket extends past edge of rigid support plate 40 by 3¾ inch along length, and 4¼ inch along width.
Formed from Neoprene® Rubber Sheet (solid sheet of synthetic rubber produced by free-radical polymerization of chloroprene, also known as "polychloroprene")
⅛ inch thickness (thickness $T_1$ is ⅛ inch)
Durometer: McMaster-Carr, Medium Hard (60A)
Fasteners 46 for attaching rigid support plate 40, elastically deformable gasket 42, and backing frame 44 to each other:
5/16 inch threaded Allen head bolts The scope of the invention is not limited to the dimensions listed above. The dimensions of the sunroof opening will determine the relative dimensions of the rigid support plate 40 and elastically deformable gasket 42.

If the elastically deformable gasket 42 shown in FIG. 3 is formed from sheet material, it has a cut-out portion wherein material is removed from its center portion so as to allow the center support structure of the brace 36 to attach directly to the bottom surface of the rigid support plate 40. In this embodiment, the elastically deformable gasket 42 can also be characterized as being a "rectangular gasket." However, the elastically deformable gasket 42 does not necessarily need to have the cut-out portion, and it may be a uniform, rectangular sheet. In this embodiment, the fasteners that connect the brace 36 to the bottom surface of the rigid support plate 40 will also need to pass through the sheet-like elastically deformable gasket 42. For purposes of this invention, both embodiments are defined as being "elastically deformable gaskets" since both embodiments perform the function of a gasket, namely, to make a joint fluid-tight.

The elastically deformable gasket 42 may also be formed via a mold process. In the mold process, it would not be necessary to remove the cut-out portion, since the mold process would directly form only the rectangular gasket.

The elastically deformable gasket 42 has properties of "elastic deformation," meaning that the material always returns back to its original shape after any stress on the gasket is removed. Here, the stress occurs as the sealing device 26 is passed through the sunroof 14. Thus, the deformation is reversible. That is, no permanent deformation occurs due to stress on the gasket. In contrast to elastic deformation, plastic deformation results in a permanent altering of the original shape.

Referring again to FIG. 3, the relative dimensions of the rigid support plate 40 with respect to the elastically deformable gasket 42 and the dimensions of the sunroof 14 are important for optimal performance of the sealing device 26. In particular, the ratio $L_1/L_2$ is about 1.28, and the ratio of $W_1/W_2$ is about 1.68. These ratios are for a sunroof 14 having an opening of about 32½ inches×about 14 inches, which means that the ratio of the sealing device 26 and the opening of the sunroof 14 is about 1.18 lengthwise, and about 1.32 widthwise. These dimension ratios allow the elastically deformable gasket 42 to pass through the sunroof 14 with relatively low force, while still providing sufficient width in its final position to adequately protect the roof opening from weather elements.

In one embodiment, the scissor jack mechanism 28 has a fully extended position wherein the surveillance equipment platform 50 extends through the sunroof, and an operational position wherein the surveillance equipment platform 50 is slightly above the opening of the sunroof 14. The operational position is the position when the second set of surveillance equipment 24 is performing its surveillance functions. As discussed below with respect to FIGS. 2A-2F, the fully extended position is slightly more extended than the operational position.

Figure 2A:
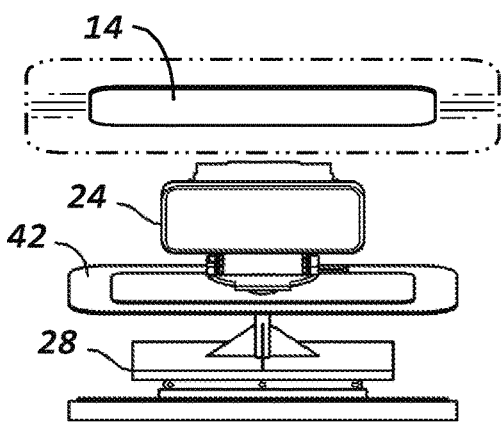
FIGS. 2A-2F are views of a retractable telescoping structure having a set of surveillance equipment mounted thereon, and a sealing device, for installation inside of the vehicle, in accordance with one preferred embodiment of the present invention.

FIGS. 2A-2F show the elements of FIGS. 4A and 4B in a variety of different positions, summarized as follows:

FIG. 2A: The second set of surveillance equipment 24 is fully retracted into the vehicle 10 and no parts of the equipment 24 extend through the sunroof 14. In this position, the sunroof 14 is preferably closed.

Figure 2D:
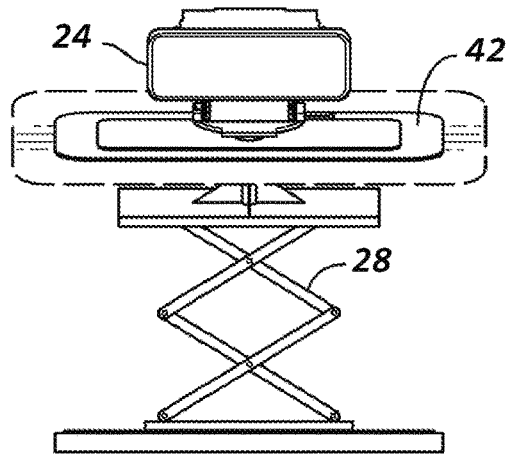
Figure 2B:
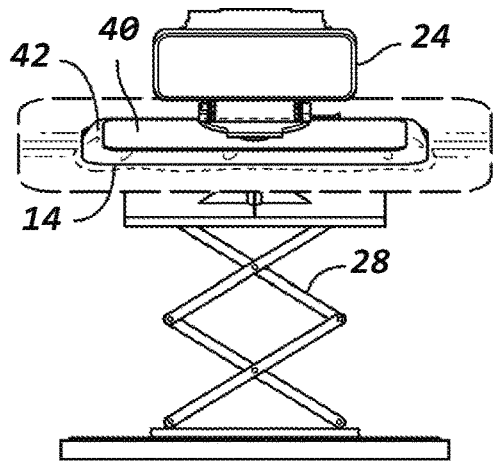

FIG. 2B: The second set of surveillance equipment 24 is being moved to its operational position outside of the vehicle 10, directly above the sunroof 14, by lifting the scissor jack mechanism 28. In this position, the sunroof 14 has been opened. The elastically deformable gasket 42 is deforming downwardly as the sealing device 26 is pushing through the opening of the sunroof 14.

Figure 2E:
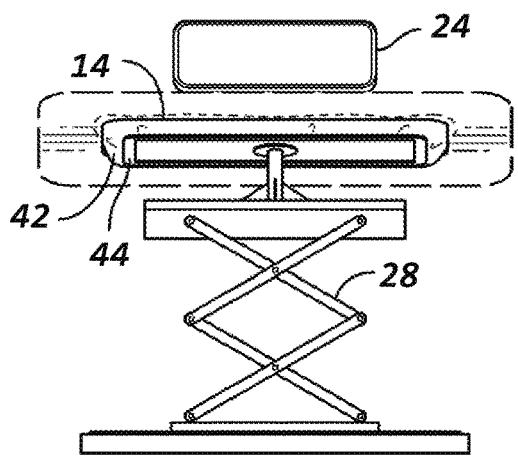
Figure 2C:
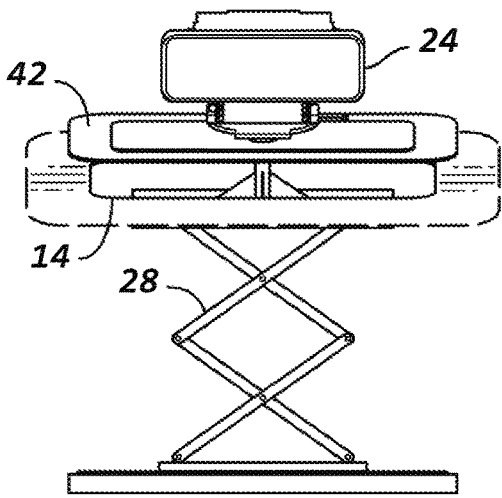

FIG. 2C: The scissor jack mechanism 28 is in a fully extended position. The second set of surveillance equipment 24 and the sealing device 26 are now both outside of the vehicle 10, directly above the sunroof 14. The elastically deformable gasket 42 has returned to its original shape because the stress applied to it in the FIG. 2B position has been removed.

FIG. 2D: The scissor jack mechanism 28 has been slightly retracted from its fully extended position to an "operational position," as described above. In this position, the sealing device 26 is seated directly on top of the opening of the sunroof 14. The edges of the elastically deformable gasket 42 span across the edges of the opening of the sunroof 14 and lay against the roof of the vehicle 10, surrounding the opening of the sunroof 14. In this manner, the sealing device 26 provides the desired environmental barrier by inhibiting water and/or dirt from entering the passenger compartment of the vehicle 10 through the open sunroof 14.

In one preferred embodiment, the scissor jack mechanism 28 retracts about 3-4 inches between the positions shown in FIGS. 2C and 2D. The scissor jack mechanism 28 is preferably programmed to retract by a sufficient distance to seal the opening of the sunroof 14. The number of times that the scissor jack mechanism 28 pushes the sealing device 26 through the opening of the sunroof 14, coupled with the age of the elastically deformable gasket 42, will determine the optimal retraction distance. As the elastically deformable gasket 42 flexes during use and ages over time, it becomes more limp which requires that the sealing device 26 be raised higher to allow the elastically deformable gasket 42 to clear the opening of the sunroof 14, which, in turn, requires a greater retraction distance to reach the optimum sealing position.

The slight retraction that occurs to form the complete seal can either be (a) manually performed by the vehicle operator, (b) pre-programmed to account for the height of the entire assembly (stack) shown in FIGS. 2A-2E, and the characteristics of the seal, or (c) automatically retracted until contact sensors (not shown) on the corners of the elastically deformable gasket 42 make contact with the roof of the vehicle 10.

FIG. 2E: Upon conclusion of a surveillance session, the scissor jack mechanism begins to retract so as to bring the second set of surveillance equipment 24 back into the interior cabin of the vehicle 10. In this position, the elastically deformable gasket 42 is deforming upwardly as the sealing device 26 is pushing through the opening of the sunroof 14, but in the opposite direction as shown in FIG. 2B.

Figure 2F:
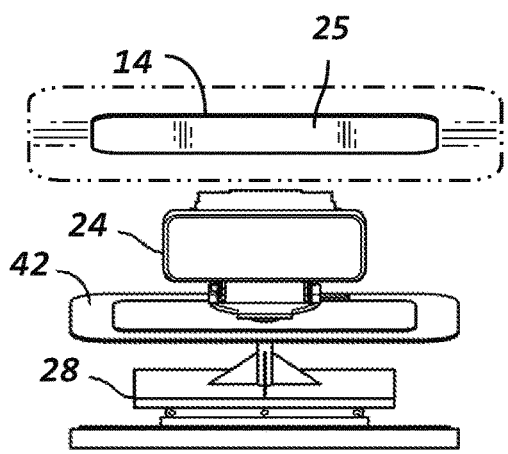

FIG. 2F: The second set of surveillance equipment 24 is now fully retracted into the vehicle 10 and no parts of the equipment 24 extend through the sunroof 14. In this position, the sunroof 14 is preferably closed. FIG. 2F thus depicts the same positioning as FIG. 2A. The elastically deformable gasket 42 has again returned to its original shape because the stress applied to it in the FIG. 2E position has been removed.

In one alternative embodiment, the pedestal-type brace 36 is not part of the assembly of elements associated with the second retractable telescoping structure 22 having the second set of surveillance equipment 24 mounted thereon (stack). In this alternative embodiment, the top surface of the scissor jack top platform 30 is attached directly to the bottom surface of the rigid support plate 40 of the sealing device 26. Thus, this embodiment is identical to FIGS. 4A and 4B, except for the removal of the brace 36.

In yet another alternative embodiment, the sealing device 26 is formed solely of the elastically deformable gasket 42, either in a solid sheet form, or in a rectangular gasket form with a rectangular cutout center region, and is attached directly to the top surface of the scissor jack top platform 30. In this embodiment, the second set of surveillance equipment 24 may also be attached to the top surface of the scissor jack top platform 30, such as via the support stand 48. The elastically deformable gasket 42 is still positioned between the second set of surveillance equipment 24 and the top surface of the scissor jack top platform 30 so as to provide the same desired environmental sealing protection as the other embodiments.

The surveillance equipment that is mounted to each of the retractable telescoping structures includes one or more sensors. The sensors may be optical, infrared, thermal, acoustic, radar, seismic RF (to detect location and range of RF signals), or any combinations thereof, or any other known forms of surveillance sensors. One or more of the sensors may incorporate a GPS compass, inertial sensors and range-finding sensor (e.g. laser rangefinder) to determine the location of an item of interest (referred to herein as a "target") as a set of GPS coordinates.

The sensors may communicate with each other so that they can work cooperatively. That is, each sensor can generate data that can be used to direct other sensors. For example, one sensor (e.g., radar) may detect a target and the GPS coordinates of its location, and may communicate the target location to another sensor (e.g., optical sensor). The other sensor may then use the location data of the target to either manually (if operated by a person) or automatically point the sensor at the target, such that the target is within a field of view of the optical sensor. A software system is provided to coordinate and control the operation of the platforms and the sensors mounted thereon. Sensor communication and software systems for target tracking may use systems and methods described in U.S. Pat. No. 10,267,598 (Fougnies), which is incorporated by reference herein, wherein the lead and follower scopes described in this patent are equivalent to the surveillance equipment 18 and 24 (sensors) on the respective first and second retractable telescoping structures 16 and 22.

The following are sample specifications for surveillance equipment and corresponding mounting structure, in accordance with one preferred embodiment of the present invention.

Surveillance equipment 18:
SMSS (Stabilized Multi-Sensor System)
  i. 2-axis gyro-stabilized precision gimbal
  ii. MWIR 700 mm cooled camera—capable of 7.5 mile human detection (using turbulence mitigation software enhancement)
  iii. HD Color camera with zoom lens, 1920×1080 resolution
  iv. LRF—up to 10 km human detection range; eye-safe
  v. Laser Illuminator—visible to Night Vision Goggles (NVGs); eye-safe Surveillance equipment 24:
Integrated Long-Range Radar System
  i. SRC SR Hawk ground surveillance radar up to 7.5 miles human detection (SR Hawk™ Ground Surveillance Radar, commercially available from SRC, Inc., North Syracuse, N.Y.)
  ii. 360 degree coverage
  iii. Tracks up to 350 simultaneous targets
  iv. Elevated through roof of crew cab of any GFE full-sized ½ ton or larger truck (possible scissor/platform, cobra or pneumatic tubular mast lift options)
  v. Automatic bottle jack, frame mounted leveling system In one preferred embodiment, a leveler is provided as part of the scissor jack mechanism 28. Certain sensors, such as radar, require that the platform on which they are mounted is level with the horizon. However, depending on the terrain, the vehicle 10 may not be level. Using a leveling sensor alone or in conjunction with a gyroscope, a leveler determines the extent to which the vehicle is not level with the horizon and adjusts the sensor platform. Alternatively, the entire vehicle may be leveled using commercially available leveling systems.

Figure 8:
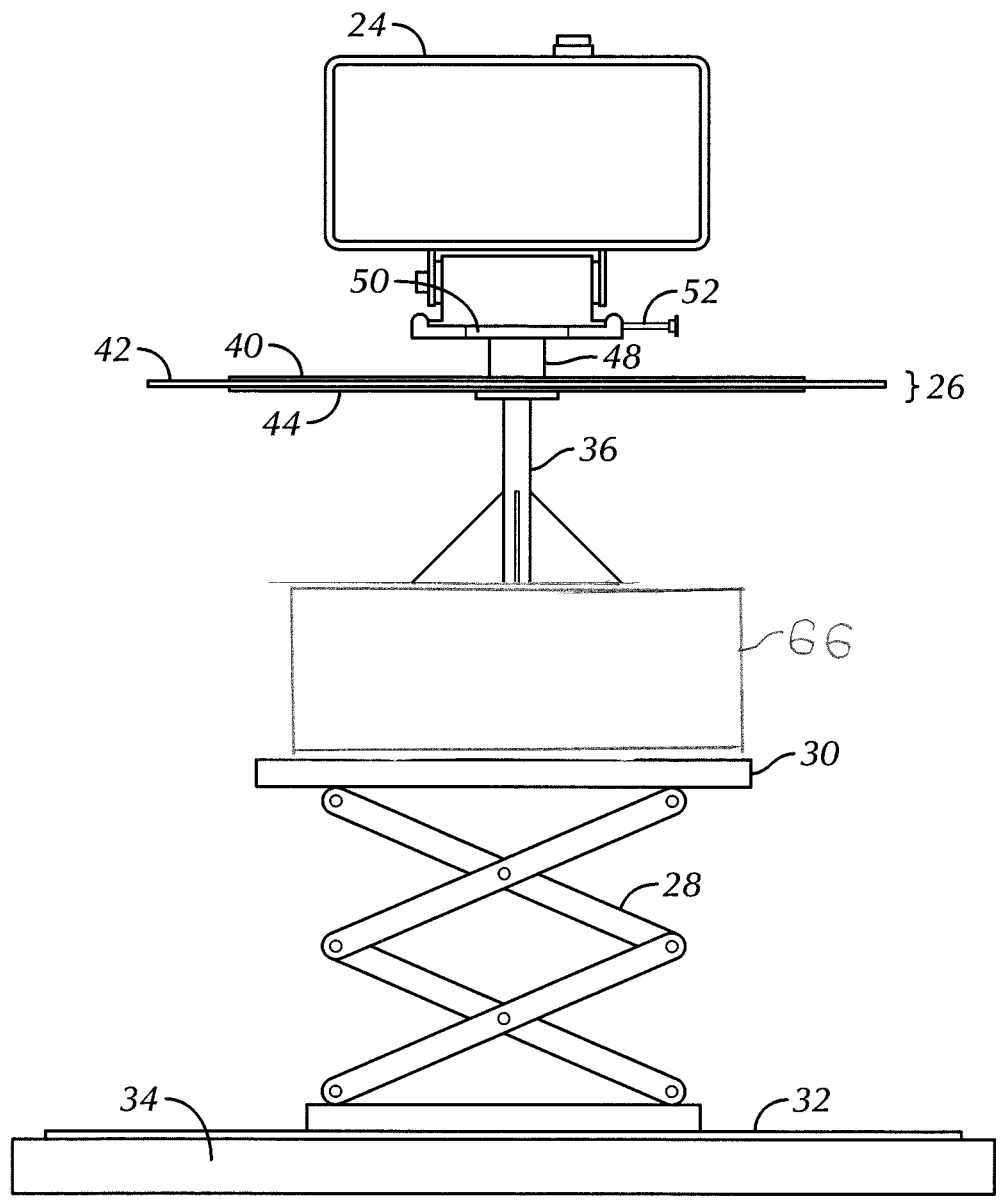
FIG. 8 shows a view of FIG. 4A, with the addition of a leveler, in accordance with one preferred embodiment of the present invention.

In one preferred embodiment, shown in FIG. 8, leveler 66 is installed between the scissor jack 28 and the brace 36 on top of the platform 30 of the scissor jack 28. More specifically, a bottom surface of the leveler 66 is fastened to a top surface of the platform 30, and a top surface of the leveler is fastened to a bottom surface of the brace 36.

Figure 6:
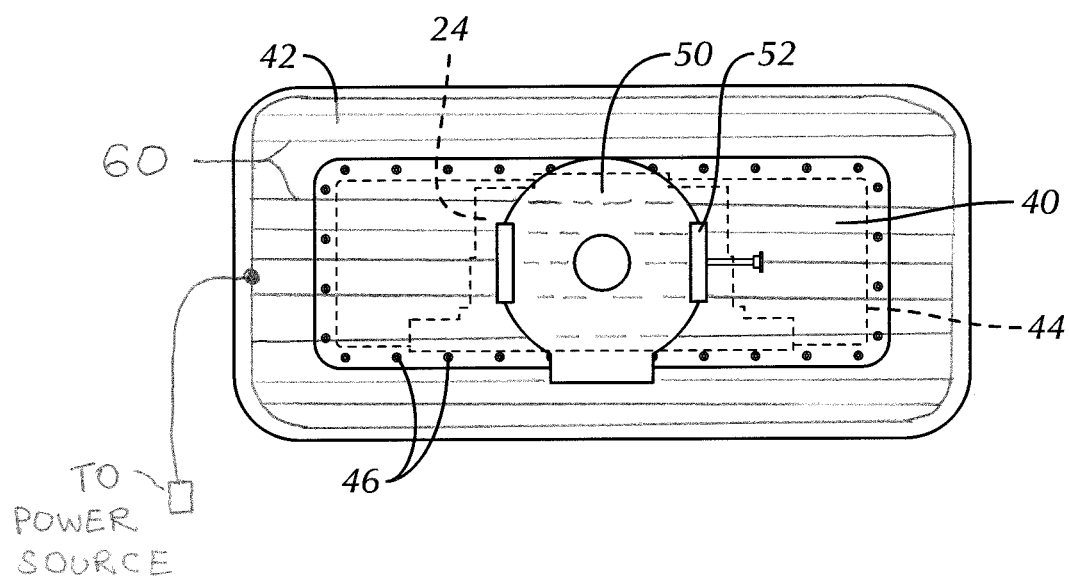
FIG. 6 shows a top surface of the sealing device that includes strips of heating elements, in accordance with one preferred embodiment of the present invention.

FIG. 6 shows an alternative embodiment wherein the top surface of the sealing device 26 includes strips of heating elements 60, similar to a vehicle window glass defroster so as to inhibit buildup of snow and/or ice on the sealing device 26. The heating elements 60 may be powered by the battery of the vehicle 10, or by another source of power that is available inside of the vehicle 10. Collected snow and/or ice may potentially interfere with retraction of the second surveillance equipment 24 into the vehicle 10.

Figure 7A:
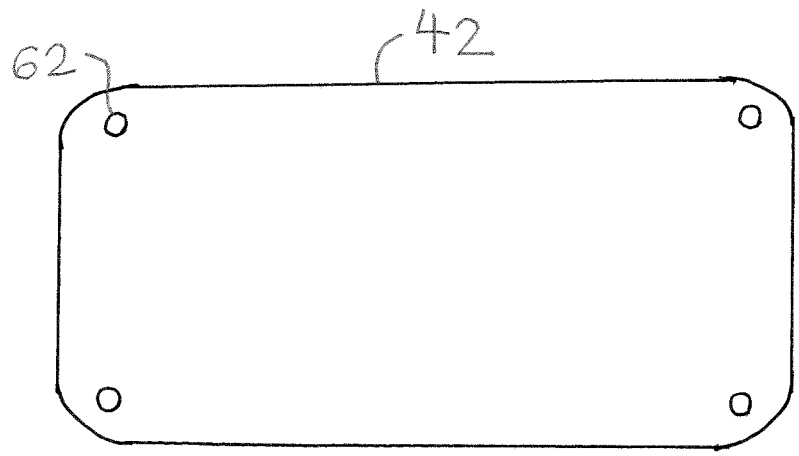
FIGS. 7A and 7B show embodiments of the sealing device that include magnets.
Figure 7B:
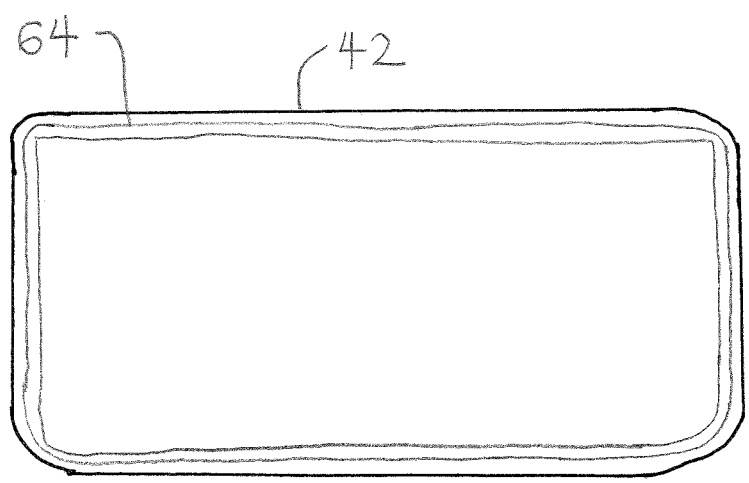

FIGS. 7A and 7B show other alternative embodiments wherein the bottom surface of the elastically deformable gasket 42 of the sealing device 26 includes magnets placed around the outer edges so as to more securely hold the sealing device 26 against the roof of the vehicle 10, such as due to wind that might allow rain or snow to get underneath the sealing device 26. In one embodiment shown in FIG. 7A, magnets 62 are securely fastened at each of the corners. In another embodiment shown in FIG. 7B, flexible magnetic tape (also, referred to as "flexible magnetic strip") 64 is used. In both embodiments, the flux of the magnetic material is selected so as to be strong enough to hold the edges of the elastically deformable gasket 42 against the roof of the vehicle 10, but weak enough to allow the elastically deformable gasket 42 to easily release from the roof of the vehicle 10 during retraction process illustrated in FIGS. 2D and 2E.

These embodiments presume that the roof of the vehicle 10 is metallic, and that when the second set of surveillance equipment 24 is in its operational position (FIG. 2D), the outer edges of the elastically deformable gasket 42 extend past the outer edges of the frame of the sunroof 14 and seat against the roof of the vehicle 10. If the roof of the vehicle is non-metallic, such as aluminum, metallic material is fastened to the roof of the vehicle 10 to mate with the magnets 62 or 64. Alternatively, if the outer edges of the elastically deformable gasket 42 seat against the outer edges of the frame of a non-metallic sunroof 14 and do not extend over the roof of the vehicle 10, metallic material is fastened to the outer edges of the frame of the sunroof 14. If metallic material is already present in the frame of the sunroof 14, this metallic material is used to mate with the magnets 62 or 64 of the elastically deformable gasket 42.

The form factor and drainage properties of the sunroof 14 and outer frame of the sunroof 14 partly determines the outer dimensions of the elastically deformable gasket 42 of the sealing device 26 and how it seals against the roof of the vehicle 10. In the most protective embodiment, the outer edges of the elastically deformable gasket 42 preferably extend past the outer frame of the sunroof 14 and seat against the roof of the vehicle 10 when the second set of surveillance equipment 24 is in its operational position (FIG. 2D), thereby completely covering all components of the sunroof 14. In an alternative embodiment wherein the outer frame of the sunroof 14 has a significant lip and the ability to drain water falling on the lip so that the water does not enter the interior space of the vehicle 10, the outer edges of the elastically deformable gasket 42 may seat against the lip of the outer frame of the sunroof 14 when the second set of surveillance equipment 24 is in its operational position (FIG. 2D). Sunroof enclosures are typically designed with a gutter trough for water to run along, and a drain tube sheds water down the vehicle to the ground.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A vehicle having an interior cabin and a roof at the top of the interior cabin, the vehicle comprising:
    (a) a flatbed;
    (b) an opening in the roof of the interior cabin;
    (c) a first retractable telescoping structure configured to receive a first set of surveillance equipment that is mounted thereon, the first retractable telescoping structure being mounted to the flatbed, the first retractable telescoping structure configured to allow the first retractable telescoping structure and the associated first set of surveillance equipment to both fully retract into the flatbed;
    (d) a second retractable telescoping structure configured to receive a second set of surveillance equipment that is mounted thereon, the second retractable telescoping structure being configured to allow the second retractable telescoping structure and the associated second set of surveillance equipment to both fully retract into the interior cabin, and to allow the second set of surveillance equipment to extend through the opening in the roof by an amount sufficient to allow the second set of surveillance equipment to be fully external to the vehicle, the second retractable telescoping structure including a top platform that is oriented to be parallel to the roof of the interior cabin;
    (e) a sealing device mounted to the second retractable telescoping structure below the second set of surveillance equipment and oriented parallel to the roof of the interior cabin, the sealing device including:
        (i) a rigid support plate fastened to the top platform, wherein the rigid support plate includes an upper surface that is configured to allow the second set of surveillance equipment to be mounted thereto, and
        (ii) an elastically deformable gasket fastened above and to the rigid support plate, the elastically deformable gasket having dimensions larger on all sides than the dimensions of the top platform, the rigid plate, and the opening in the roof, wherein edges of the elastically deformable gasket are configured to elastically deform during travel of the sealing device through the roof of the interior cabin when the second set of surveillance equipment extends through the opening in the roof during extension of the second retractable telescoping structure, and when the second set of surveillance equipment retracts into the interior cabin during retraction of the second retractable telescoping structure.

2. The vehicle of claim 1 wherein the opening in the roof of the interior cabin is a sunroof of the vehicle.

3. The vehicle of claim 1 wherein the elastically deformable gasket is polychloroprene.

4. The vehicle of claim 1 wherein the rigid support plate is fastened to the top platform via a brace, the brace being fastened at one end to a top surface of the top platform, and being fastened at the other end to a bottom surface of the rigid support plate.

5. The vehicle of claim 1 further comprising:
   (f) a leveler mounted to the second retractable telescoping structure.

6. A vehicle having an interior cabin and a roof at the top of the interior cabin, the vehicle comprising:
   (a) a flatbed;
   (b) an opening in the roof of the interior cabin;
   (c) a first retractable telescoping structure configured to receive a first set of surveillance equipment that is mounted thereon, the first retractable telescoping structure being mounted to the flatbed, the first retractable telescoping structure configured to allow the first retractable telescoping structure and the associated first set of surveillance equipment to both fully retract into the flatbed;
   (d) a second retractable telescoping structure configured to receive a second set of surveillance equipment that is mounted thereon, the second retractable telescoping structure being configured to allow the second retractable telescoping structure and the associated second set of surveillance equipment to both fully retract into the interior cabin, and to allow the second set of surveillance equipment to extend through the opening in the roof by an amount sufficient to allow the second set of surveillance equipment to be fully external to the vehicle, the second retractable telescoping structure including a top platform that is oriented to be parallel to the roof of the interior cabin;
   (e) a sealing device mounted to the second retractable telescoping structure below the second set of surveillance equipment and oriented parallel to the roof of the interior cabin, the sealing device being fastened to the top platform, the sealing device being an elastically deformable gasket having dimensions larger on all sides than the dimensions of the top platform and the opening in the roof, wherein edges of the elastically deformable gasket are configured to elastically deform during travel of the sealing device through the roof of the interior cabin when the second set of surveillance equipment extends through the opening in the roof during extension of the second retractable telescoping structure, and when the second set of surveillance equipment retracts into the interior cabin during retraction of the second retractable telescoping structure.

7. The vehicle of claim 6 wherein the opening in the roof of the interior cabin is a sunroof of the vehicle.

8. The vehicle of claim 6 wherein the elastically deformable gasket is polychloroprene.

9. The vehicle of claim 6 further comprising:
   (f) a leveler mounted to the second retractable telescoping structure.

* * * * *